(12) United States Patent
Rieth et al.

(10) Patent No.: US 8,976,015 B2
(45) Date of Patent: Mar. 10, 2015

(54) EXTRACTION OF CAN BUS SIGNALS WITHOUT FEEDBACK

(75) Inventors: Peter Rieth, Eltville (DE); Enno Kelling, Eschborn (DE); Marc Menzel, Marburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 2049 days.

(21) Appl. No.: 11/920,955

(22) PCT Filed: May 16, 2006

(86) PCT No.: PCT/EP2006/062332
§ 371 (c)(1),
(2), (4) Date: Mar. 4, 2011

(87) PCT Pub. No.: WO2006/125733
PCT Pub. Date: Nov. 30, 2006

(65) Prior Publication Data
US 2011/0199229 A1   Aug. 18, 2011

(30) Foreign Application Priority Data

May 24, 2005   (DE) .......................... 10 2005 023 893
Aug. 5, 2005   (DE) .......................... 10 2005 037 596
Sep. 2, 2005   (DE) .......................... 10 2005 042 060

(51) Int. Cl.
*B60Q 1/00*   (2006.01)
*H04Q 1/08*   (2006.01)
(Continued)

(52) U.S. Cl.
CPC .................. *H04B 3/56* (2013.01); *G01D 21/00* (2013.01); *H04L 12/40032* (2013.01); *H04B 2203/5441* (2013.01); *H04B 2203/5458* (2013.01); *H04B 2203/547* (2013.01);
(Continued)

(58) Field of Classification Search
None
See application file for complete search history.

(56) References Cited

U.S. PATENT DOCUMENTS 7,769,513 B2 *   8/2010   Breed et al. ...................... 701/45
7,831,363 B2 *   11/2010  Quigley .......................... 701/50
(Continued)

FOREIGN PATENT DOCUMENTS

DE   69623204   1/1997
DE   10343844   4/2005
(Continued)

*Primary Examiner* — Julie Lieu

(57) ABSTRACT

Disclosed is a method and a circuit configuration as well as a navigation system are disclosed, wherein the extraction and transmission of signals running on a line bus (1, 2) is carried out without having to sever the bus cable. Furthermore, a sensor (4) is disclosed, which outputs sensor signals reproducing the line signals and wherein the output sensor signals are amplified by a signal processing unit (11) and transformed into a defined digital signal shape (22). The filtered signals are then transmitted to a display device (14) or another device via an additional bus in wireless manner or by way of a line. The invention further relates to a tapping device for the wireless tapping of CAN data from a CAN line by the electromagnetic field, without having to sever the CAN lines, having a pivotable top shaped part (32), which can be pressed against a bottom part (35) by way of a pivot mechanism (41) for the purpose of accommodating CAN cables, and guide grooves (31 for accommodating the CAN cables (CAN1, CAN2), with conductor loops, in the closed position of the pivot mechanism, being closed around the CAN cables which are connectable to a signal processing electronics.

14 Claims, 4 Drawing Sheets

(51) Int. Cl.
  *H04B 3/56* (2006.01)
  *G01D 21/00* (2006.01)
  *H04L 12/40* (2006.01)
  *H04W 28/06* (2009.01)

(52) U.S. Cl.
  CPC .................. *H04B 2203/5487* (2013.01); *H04B 2203/5491* (2013.01); *H04L 2012/40215* (2013.01); *H04L 2012/40273* (2013.01); *H04W 28/06* (2013.01)
  USPC ........... 340/438; 340/901; 340/531; 340/533; 340/534

(56) References Cited

U.S. PATENT DOCUMENTS

| | | | | |
|---|---|---|---|---|
| 7,941,480 | B2 * | 5/2011 | Atsmon et al. | 709/202 |
| 7,953,311 | B2 * | 5/2011 | Mullaney et al. | 385/137 |
| 8,191,419 | B2 * | 6/2012 | Wilby | 73/304 C |
| 8,393,101 | B2 * | 3/2013 | Knight et al. | 40/611.12 |
| 8,532,273 | B2 * | 9/2013 | Park et al. | 379/106.01 |
| 2001/0005574 | A1 * | 6/2001 | Manemann et al. | 433/11 |
| 2007/0025597 | A1 * | 2/2007 | Breed et al. | 382/104 |
| 2007/0189323 | A1 * | 8/2007 | Swoboda et al. | 370/451 |
| 2007/0239318 | A1 * | 10/2007 | vanRuymbeke et al. | 700/295 |
| 2011/0072123 | A1 * | 3/2011 | Hsu et al. | 709/223 |
| 2011/0224937 | A1 * | 9/2011 | Nishimura | 702/106 |

FOREIGN PATENT DOCUMENTS

| | | |
|---|---|---|
| DE | 10345359 | 4/2005 |
| DE | 102007049761 A1 * | 4/2009 |
| EP | 1189393 | 3/2002 |
| EP | 1292045 | 3/2003 |
| FR | 2812437 | 2/2002 |
| WO | 97/28988 | 8/1977 |

* cited by examiner

EXTRACTION OF CAN BUS SIGNALS WITHOUT FEEDBACK

BACKGROUND OF THE INVENTION

Modern vehicles are equipped with a large number of controlled devices and sensors, such as a controlled brake system, a controlled steering system, and a controlled suspension system. Usually, each of these devices has an ECU of its own, which compares the measured actual values with predetermined nominal values and outputs output signals corresponding to the result of comparison. The control performance of the individual devices, in turn, can depend on the condition of other controlled devices. Thus, the performance of the controlled steering system can e.g. depend on the condition of the suspension system or on the actual value calculated by the ECU of the suspension system, respectively. It is this way possible that when the vehicle drives at low sped on a poor road surface, a change of angle of the steering wheel can cause a much more significant change of the steering angle than is the case when the vehicle drives quickly on a plane road. Thus, all or a large part of the individual devices and sensors are cross-linked. There is an exchange of information between the ECUs of the individual devices by way of a network. This network allows e.g. transmitting measured values such as the rotational speed of the motor, the acceleration of the vehicle, the yaw angle of the vehicle, the tire pressure, the slip of the tires, the steering angle of the vehicle, the speed of the vehicle relative to the ground, the engine or wheel rotational speed, the temperature of oil and cooling water, the acceleration, and the yaw rate.

In general, only a few of these pieces of information conveyed in the mentioned network will be displayed to the driver on the instrument panel of the vehicle. The display of such information is often limited to the temperature of the cooling water and the speed. It is, however, in many cases desirable for the drivers of vehicles to have access to additional information exchanged in the network, which under certain circumstances may considerably go beyond the information that is made available to the driver on the instrument panel in the vehicle supplied by a manufacturer. This applies, for example, to drivers being interested in knowing which values e.g. the engine or the rotational speed, the oil temperature, the acceleration, and the yaw rate will adopt during driving, or how a vehicle behaves in certain situations in traffic and which values individual parameters will adopt then, such as the length of a stopping distance when braking on a defined underground.

In view of the above, an object of the invention involves providing the driver of a vehicle with additional information about the state of the vehicle, going beyond what is typically offered to the driver on instrument panels in the vehicle. This access to information exchanged in the network shall be possible retroactively, i.e. after delivery of the vehicle. To allow this retroactive access to information, there is need for a device tapping the information from the vehicle network, without modifying the cabling of the vehicle, since an intervention into the cabling of a motor vehicle, unless this action is taken by an expert, can lead to lapse of the general type approval for this vehicle. Another objective of the invention is that the retroactively arranged extraction of the desired information will definitely not inhibit or even modify the information flow in the network so that the extraction of information is negligible with respect to its effect on the data flow in the network.

SUMMARY OF THE INVENTION

The invention is therefore based on a circuit configuration for the wireless extraction, essentially without feedback, and transmission of signals running on a line bus (1, 2). A sensor (4) is provided, which is fed by the fields produced by the signals, and outputs sensor signals (at 8, 9) reproducing the line signals, in that a signal conditioning unit (11) is provided which amplifies the sensor signals output by the sensor (4) and converts them into a defined digital signal shape (22), and in that a microcontroller (12) is provided which filters the defined digital signals corresponding to the significance attached to them, with the filtered signals being sent to a display device (14) or another device by an additional bus in wireless manner or by way of a line. The object is also achieved by a method for the wireless extraction, essentially without feedback, and transmission of signals running on a line bus (1, 2). A sensor (4) is fed by fields produced by the signals, outputs sensor signals reproducing the line signals, in that the output sensor signals are amplified in a signal conditioning unit (11) and converted into a defined digital signal shape (22), and in that subsequently the defined digital signals are filtered by a digital circuit, which comprises a microcontroller (12) in particular, corresponding to the significance attached to them, and the filtered signals are sent to a display device (14) or another device by an additional bus in wireless manner or by way of a line. Thus, the invention principally resides in evaluating the (electromagnetic) fields, which have been produced by the signals exchanged in the network, and to filter the desired information from the signals extracted in such a way. Further, the invention at issue describes a sensor, which is suitable for the circuit configuration of the invention and for implementing the method of the invention.

A CAN bus is typically used to exchange the information between the individual controlled devices and measuring sensors of a vehicle. In an improvement of the invention, the line bus (1) is a CAN bus of a motor vehicle, to which are connected several devices of the motor vehicle being monitored and/or controlled, and in that the sensor (4) is fed by electric or magnetic fields, which result from the signals on the CAN bus (1).

Although the evaluation of magnetic fields for extraction of the signals on the CAN bus is also possible that the electric field of the CAN bus induced by the signals is evaluated because a comparatively inexpensive and simply configured circuit is achieved hereby. It is preferred that the sensor of the circuit configuration is designed as a capacitor, with the CAN bus itself forming one of the two printed circuit boards of the capacitor.

It is especially favorable to implement the invention on a CAN bus including two lines (2, 3), with the second line (2) conducting signals being inverse in relation to the signals on the first line (1), and in that the sensor (4) is designed in such a manner that it forms two separate capacitors with respect to the two lines (1, 2) of the CAN bus (1). The sensor scans the electric fields of the two CAN lines.

The sensor is designed in such a manner that it can be plugged detachably onto the CAN bus (1) by means of a plug coupling (4) in order to retroactively fit the sensor of the circuit configuration of the invention in a particularly simple fashion.

A particularly simple sensor structure is obtained by a sensor (4) that is composed of two preferably symmetrically configured sensor halves (5, 6), which include grooves (7) corresponding to the associated line (1 or 2, respectively) that are provided with a coating forming a portion of a plate of the capacitor in such a fashion that a uniform capacitor plate is produced when the two sensor halves are plugged together.

Furthermore, the invention refers to a navigation system, which comprises the sensor described or the described circuit configuration for signal tapping according to the invention at topic.

The navigation system is preferably implemented in a PDA or mobile computer, respectively. Accordingly, the navigation system can also be an add-on unit, which is provided for the retroactive, fixed mounting into the vehicle. Known mobile navigation systems of this type, which do not have a CAN data access, exclusively rely on the position data originating from a GPS receiver for position determination. This position data is frequently quite inexact, since more coarse inaccuracies can develop e.g. in the event of shadowing of the GPS signals that originate from satellites. In navigation systems, which are also known in the state of the art and are fixed in the vehicle, information of the wheel rotational speed sensors and, optionally, also the acceleration and yaw rate sensors is therefore evaluated in order to allow navigation also in areas with poor GPS reception or without GPS reception. The invention renders it possible to take into account the required vehicle signals for improving accuracy, even with mobile or retroactively fixedly installed navigation systems, without modifying the vehicle in an inadmissible way (e.g. violation of the warranty provision or type approval by cutting the CAN cable open). For this purpose, the navigation system preferably has a connecting cable, which comprises the sensor that has been described hereinabove.

According to another preferred embodiment, the CAN information can also be sent to the mobile computer or the add-on unit with the implemented navigation system, whereby a noticeable improvement of the capacity of these units is achieved.

The part of the invention, which refers to the propagation of the received CAN signals via a radio link, can of course also be used in a very favorable manner for the improvement of a navigation system on the basis of a mobile computer or add-on unit, even without the non-contact coupling.

The invention will be described in more detail in the following by means of embodiments by way of Figures. In the accompanying drawings:

DETAILED DESCRIPTION OF THE DRAWINGS

In up-to-date vehicles, a CAN bus is almost always used as a network. Especially the so-called power train CAN, to which engine control unit, brake control unit and gear control unit are connected, provides most information about the condition of the vehicle. This CAN bus is typically led through an unshielded, twisted two-wire cable.

According to the invention, there are two possibilities for tapping the information, which prevails on the CAN bus as a result of current or voltage pulses, in a non-contact fashion and to a large extent without feedback:

The first possibility involves measuring the magnetic field being produced by the current that flows in the CAN wires. To realize the first possibility, a Rogovski coil is laid around each individual of the two wires of the CAN cable. A Rogovski coil, as is known, is a ferrite core covered by a wire-wound coil. This type of coil is used in order to maximize the magnetic flux through the wire-wound coil and, thus, the induced signal being obtained. The current signals on the CAN bus induce signals in the coils being representative of the differentiated picture of the CAN signals. These induced signals are then conditioned by a suitable amplifier electronics and integration electronics in such a fashion that an exact picture of the CAN signal is obtained. The signal can also be achieved by only one single Rogovski coil. When two coils are employed, however, differential information is obtained which is less interference-prone. This is important in this embodiment of the method of the invention because the induced signals are very small.

The second possibility involves measuring the electric filed being produced by the voltage applied to the CAN wires. This second possibility can be realized in that a plug is attached on the CAN bus, with at least one wire being led through an opening in the plug.

Figure 1:
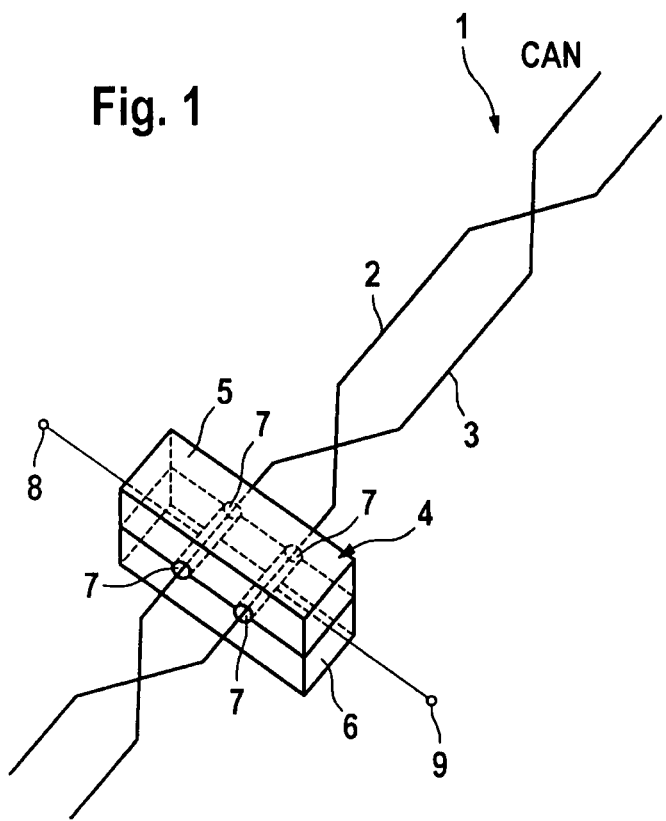
FIG. 1 is a simplified view of the connection of a sensor with a CAN bus.

FIG. 1 shows details in this respect. FIG. 1 outlines a CAN bus 1 having two twisted lines 2 (CAN1) and 3 (CAN2). The first line 2 and the second line 3 are enclosed by a sensor 4, including a top part 5 and a bottom part 6. The top part and the bottom part are composed of electrically non-conductive material. Sensor 4 is thus divided centrically into two halves. The two surfaces of top part 5 and bottom part 6 facing each other include in each case two parallel extending and associated grooves 7, which preferably have a semi-circular cross-section. Two opposed grooves thus form in the sensor 4 a cylindrical bore, which encloses the first line 2 or the second line 3, respectively. The surfaces of the grooves 7 are covered by a metal layer not illustrated in the Figures. The two halves 5 and 6 are connected to each other, preferably in a detachable way. With the halves joined, the two metal layers of the associated grooves bear against each other and are connected electrically so that in each case two metal layers form a cylindrical tube. This will achieve a capacitance between the lines 2 or 3 and the associated metal tubes, which is referred to as capacitor in many cases hereinbelow.

The metal tubes are connected to electrical taps 8 and 9, which form the outputs for the sensor 4 and whereat the electric voltage prevailing at the capacitances can be tapped. The voltages at the lines 2 and 3 are usually inverse with respect to each other, i.e. when 'high' is applied to one line, then 'low' is applied to the other line.

Since the signals extracted by way of sensor 4 are very weak and, moreover, not all the information on the CAN bus shall be indicated to the driver of the vehicle, the extracted signals are sent to an amplifier and evaluation electronics, which will be referred to briefly as evaluation electronics 10 in the following.

Figure 2:
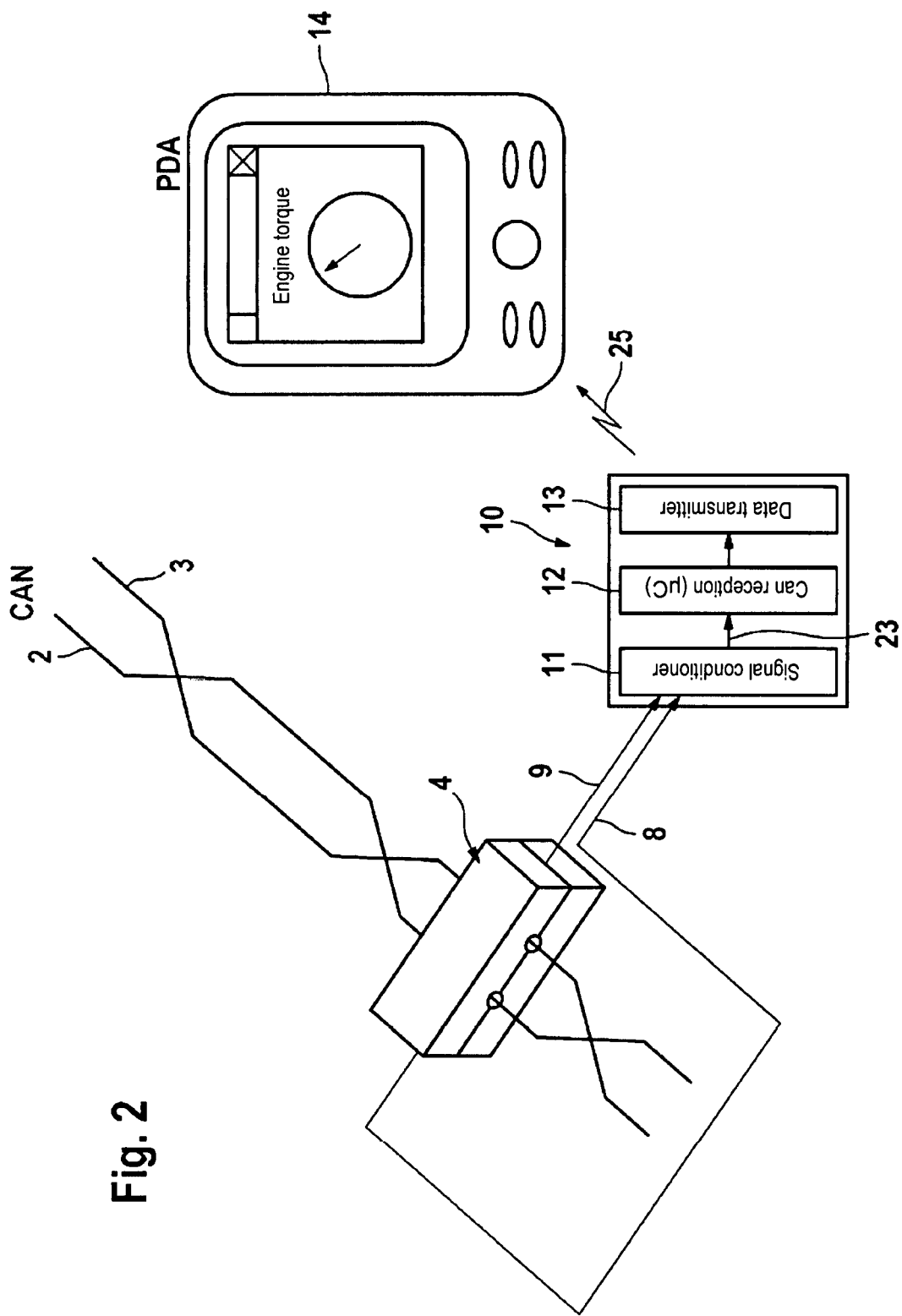
FIG. 2 is a block diagram for illustrating the connection between the sensor in FIG. 1 with an evaluating circuit and a PDA.

As can be seen in FIG. 2, the evaluation electronics 10 comprises a signal conditioning unit 11, a CAN reception 12, and a data transmitter 13. In the signal conditioning unit 11, the inverse, weak output signals are amplified and discriminated at the taps 8 and 9 of the sensor 4. After the input signals of the evaluation electronics 10 have been amplified and discriminated, they have a standardized format with high pulses and low pulses, which can be read in by a μ controller and can be sent to a display 14 by way of the data transmitter 13, preferably in a wireless manner by way of a radio link 25. As it is not desired to transmit all pieces of information on the CAN bus to the display 14, a filter is provided in a CAN-reception 12 that includes a μ controller, the said filter, based on the coding of the extracted and amplified signals, relaying only those pieces of information to the data transmitter 13 which are of interest to the driver.

Figure 3:
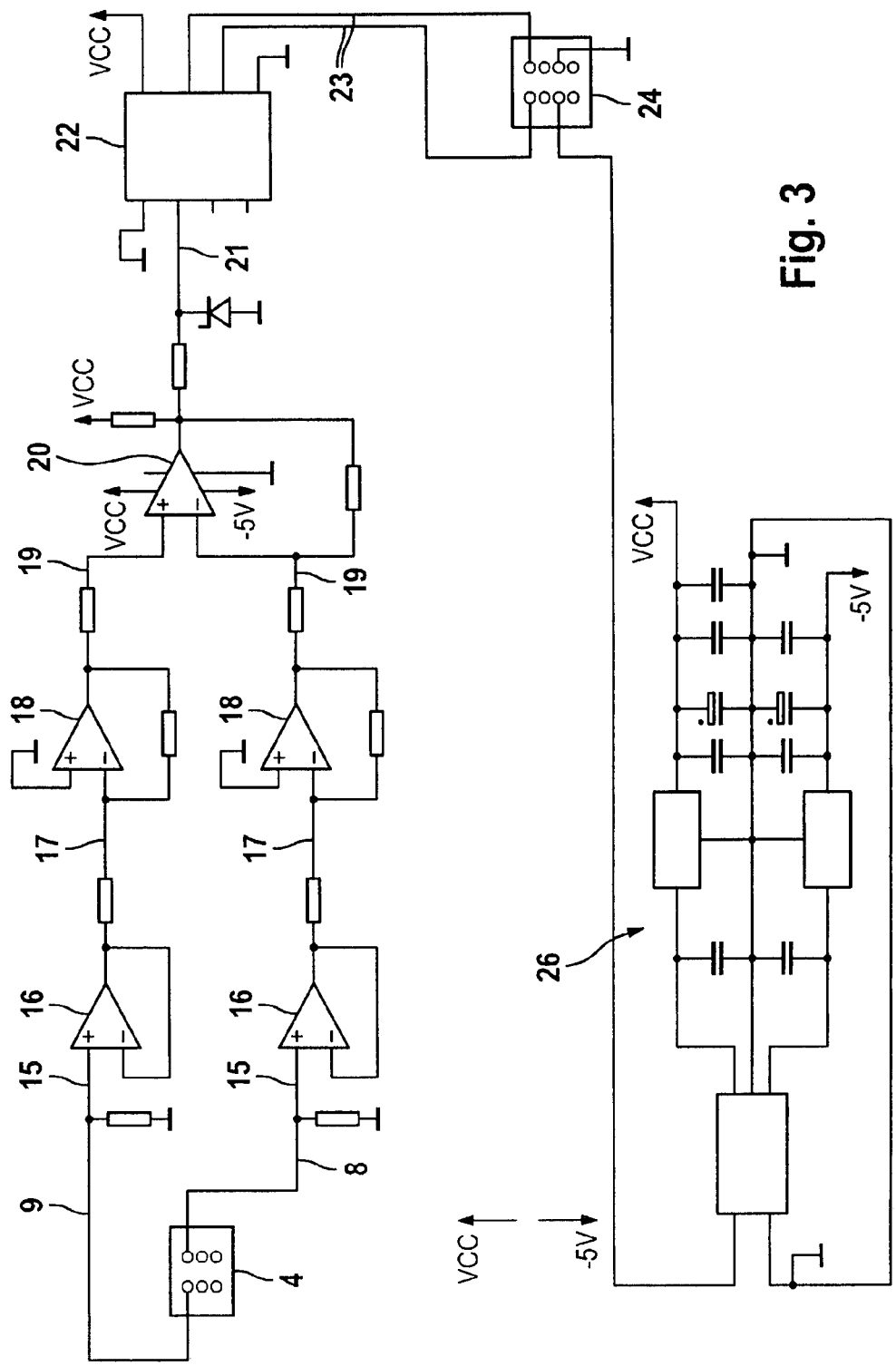
FIG. 3 is a symbolic representation of the design of a signal conditioning unit for the evaluating circuit in FIG. 2.

A mobile computer such as a Personal Digital Assistant (PDA), or any other appropriate display device, can be provided as a display 14, for example. The display of the engine torque is illustrated in FIG. 2, for example. FIG. 3 shows further details with regard to the evaluation electronics 10.

FIG. 3 illustrates details of the signal conditioning unit 11 that pertains to the evaluation electronics 10. As has been explained already with regard to FIGS. 1 and 2, the sensor 4 outputs weak signals, which correspond to the signals on the CAN bus 1, at the taps 8, 9 forming the sensor's outlets. Since these signals are relatively weak, they are led to the high-ohmic inlet 15 of an impedance converter 16, at whose low-ohmic outlet 17 the signals then prevail. As has been described hereinabove, the signals on the two lines 2 and 3 of the CAN bus are inverse relative to one another. The same applies to the signals at the outlets 8, 9 of the sensor 4. Therefore, an own impedance converter 15 and an amplifier 18 is respectively associated with each of the two lines 8, 9. The impedance converter 15 and the amplifiers 18 are designed as operational amplifiers and have the usual design.

The amplified signals at the outlets 19 of the two amplifiers 18 are applied to the two inlets of a comparator 20. The comparator 20 evaluates, whether two inverse signals prevail at its inlets and which polarity the signals have and, accordingly, will then output an output signal to the inlet 21 of a CAN driver 22. The CAN driver 22 converts the signals at its inlet 21 into signals at its outlets 23, which have the format that is typical on the CAN bus, as it has been described, for example, hereinabove with respect to the lines 2 and 3. Hence, the signals on the two outlets 23 are inverse relative to each other and can be tapped at the plug 24. This way, signals are available at the plug 24 in a form, which correspond to the signals on the lines 1 and 2, while, however, there are no feedback effects, as they have to be expected in the event of direct coupling to the lines 1 and 2. A power pack 26 of usual design feeds the circuit according to FIG. 3.

In a brief summary, the design of the circuit configuration of the invention can thus be realized in that a plug is plugged on the CAN bus, which leads each wire through a double groove. The double grooves 7 are coated with metal so that a structure develops, which corresponds to a coaxial capacitor (cf. FIG. 1). The signal of the CAN bus 1, which is capacitively coupled to the double grooves, is recuperated by an appropriate amplifier and evaluation electronics 11 (see FIG. 3). The conditioned signal can then be read in by a customary CAN controller 22.

In order that the driver can actually utilize the information, the information received has to be decoded by a microcontroller 12 still and conveyed to a display unit. Well suited as universal display unit 14 is e.g. a PDA, to which data is sent, e.g. by way of a BLUETOOTH® radio modem or W-LAN 25. A special program must then condition and picture the data on the PDA. The overall system is illustrated in FIG. 2.

Figure 4:
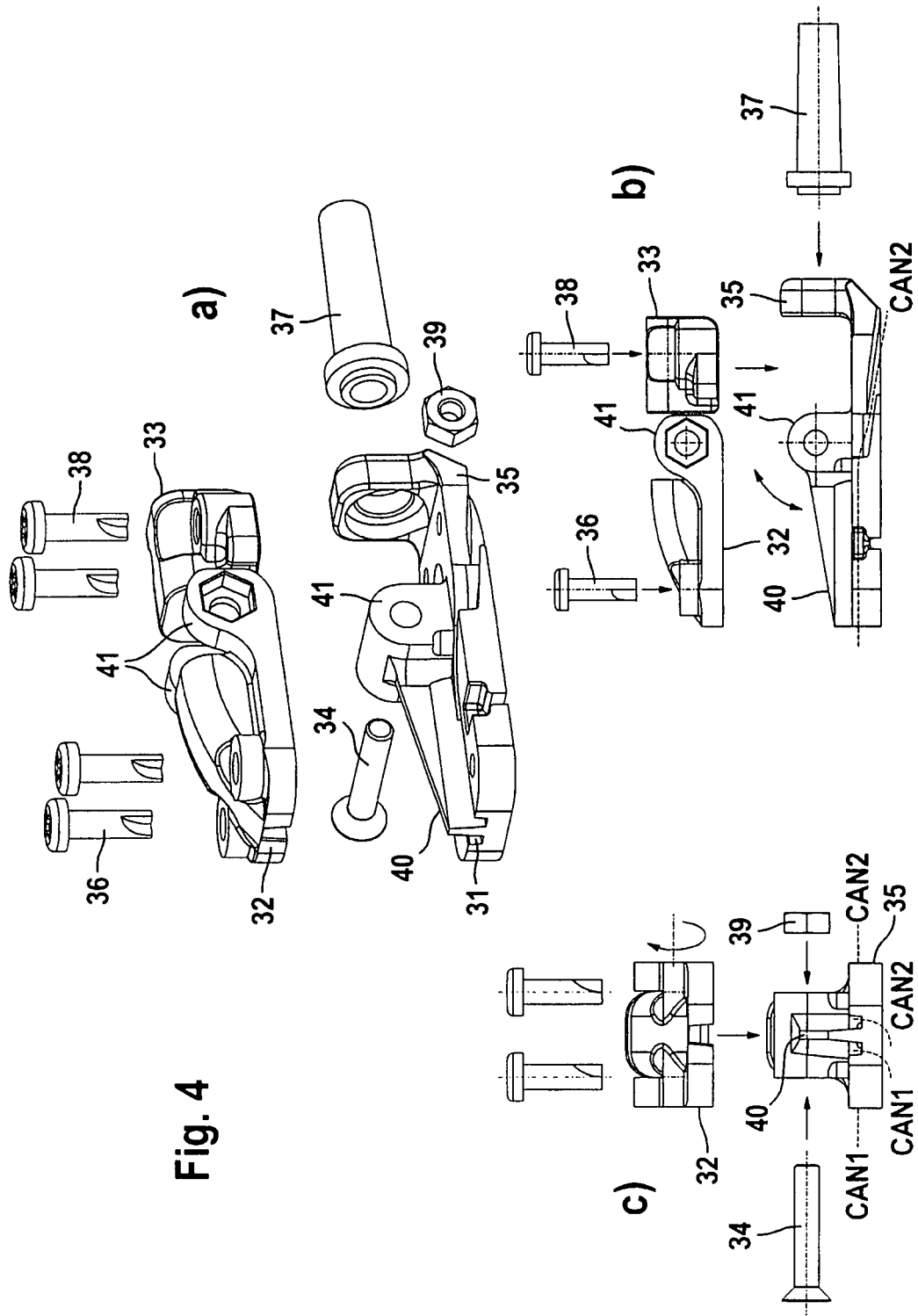
FIG. 4 is a tapping device, which allows putting the concept of the sensor into practice in an especially simple fashion.

FIG. 4 shows an example for a tapping device of the invention, which has a collapsible design and, therefore, comprises two parts 35 and 32 that can swing towards each other. The parts, which are manufactured of a partly conductively coated plastic material, are rotatably connected by screw 34 and nut 39. As a result, the tapping device is easy to handle by the operator of the motor vehicle, since it is not necessary to damage the CAN cable pertaining to the motor vehicle. For an improved utilization of space, the tapping device is arranged parallel to the CAN bus, what is in contrast to tapping in FIG. 1. Therefore, the lines leading away from the tapping device extend essentially in parallel to the CAN bus and to the longitudinal axis of the tapping device. The CAN cable CAN1, CAN2 can be laid into the tapping device, being separated by a narrow web 40, in parallel to the longer axis of the web and being guided in grooves 31. Reference numeral 40 refers to a narrow web, which is positioned in the front area of the tapping device and allows a simpler separation of the signal cables during the assembly. The CAN cables CAN1, CAN2 are led only over a short distance through the tapping device in order that the CAN bus is required to be ripped up over a short length only. The shutter 32 fastened by a screw hinge 41, which is suitably designed in such a fashion that it can be closed or locked by screws 36, allows multiple opening and closing. The signal cables outgoing the rear area of the tapping device are relieved by a cover 33 mounted with screws 38 to part 35. In addition, anti-kink nozzle 37 prevents damages to the connecting cable (not shown) by kinking.

The special advantage of the system described can be seen in that no intervention into the cabling of the vehicle is necessary, on the one hand, while no reaction to the vehicle network is possible, on the other hand, not either in the case of malfunction of software or hardware, and finally a very simple adaptation to different vehicles is possible due to the separation of the signal generation and the display unit, since only the software on the PDA has to be adapted.

The invention claimed is:

1. A method for wireless extraction, essentially without feedback, and transmission of signals running on a line bus (1, 2), the method comprising:
    producing output sensor signals from a sensor (4), which is fed by fields produced by the signals running on the line bus;
    amplifying the output sensor signals in a signal conditioning unit (11);
    converting the output sensor signals into defined digital signals (22);
    filtering the defined digital signals by a digital circuit; and
    sending the filtered signals to a display device (14) or another device by an additional bus in wireless manner or by way of a line.

2. A circuit configuration for wireless extraction, essentially without feedback, and transmission of signals running on a line bus (1, 2), the circuit comprising:
    a sensor (4), wherein the sensor is fed by fields produced by the signals running on the line bus, and wherein sensor signals output (at 8, 9) reproduces the signals running on the line bus;
    a signal conditioning unit (11) for amplifying the sensor signals output by the sensor (4) and for converting the sensor signals into defined digital signals (22); and
    a microcontroller (12), wherein the microcontroller filters the defined digital signals corresponding to a significance attached to them, with the filtered signals being sent to a display device (14) or another device by an additional bus in wireless manner or by way of a line.

3. The circuit configuration as claimed in claim 2, wherein the line bus (1) is a CAN bus of a motor vehicle, to which are connected several devices of the motor vehicle being monitored and/or controlled, and the sensor (4) is fed by electric or magnetic fields, which result from the signals on the CAN bus (1).

4. The circuit configuration as claimed in claim 3, wherein the sensor (4) is fed by electric fields, which result from signals on the CAN bus (1).

5. The circuit configuration as claimed in claim 4, wherein the sensor (4) is designed so that it acts at least with regard to a line (1 or 2, respectively) of the CAN bus (1) as a capacitor, at which the extracted electric signals (at 8, 9) can be tapped.

6. The circuit configuration as claimed in claim 4, wherein the CAN bus (1) includes two lines (2, 3), with the second line (2) conducting signals being inverse in relation to the signals on the first line (1), and in that the sensor (4) is designed in such a manner that it forms two separate capacitors with respect to the two lines (1, 2) of the CAN bus (1).

7. The circuit configuration as claimed in claim 4, wherein the sensor is designed so that it can be plugged detachably onto the CAN bus (1) by means of a plug coupling (4).

8. The circuit configuration as claimed in claim 4, wherein the sensor (4) is composed of two preferably symmetrically configured sensor halves (5, 6), which include grooves (7) corresponding to the associated line (1 or 2, respectively) that are provided with a coating forming a portion of a plate of the capacitor in such a fashion that a uniform capacitor plate is produced when the two sensor halves are plugged together.

9. The circuit configuration as claimed claim 2, wherein the signals sensed by the sensor are conveyed to a navigation system and are used there in particular for improving the accuracy of position.

10. The circuit configuration as claimed in claim 2, wherein the signals sensed by the sensor are transmitted via a radio interface such as BLUETOOTH®, WLAN, ZigBee™ to an external device, such as a PDA, a laptop, or a corresponding portable computer.

11. A sensor (4) for a circuit configuration for extracting without feedback and transmission of signals running on a CAN bus (1), the sensor comprising:

a sensor (4) is fed by fields produced by the signals running on the CAN bus and outputs sensor signals (at 8, 9) that correspond to the signals running on the CAN bus, wherein the sensor (4) acts as a capacitor at least with respect to one line of the CAN bus (1), and extracted electric signals (8, 9) can be tapped at the capacitor.

12. The sensor as claimed in claim 11, wherein the sensor (4) forms two separate capacitors with respect to the two lines (1, 2) of the CAN bus (1).

13. The sensor as claimed claim 11, wherein the sensor can be plugged detachably onto the CAN bus (1) by means of a plug coupling (5, 6).

14. The sensor as claimed claim 11, wherein the sensor is composed of two symmetrically configured sensor halves (5, 6), which include grooves (7) corresponding to the associated line (1 or 2, respectively) that are provided with a coating forming a portion of a plate of the capacitor in such a fashion that a uniform capacitor plate is produced when the two sensor halves are plugged together.

* * * * *